US005940297A

United States Patent [19]

Van de Wynckel

[11] Patent Number: 5,940,297

[45] Date of Patent: Aug. 17, 1999

[54] MULTI-COMPONENT APPARATUS WITH IMPROVED SERVICING CHARACTERISTIC

[75] Inventor: Werner Van de Wynckel, Mortsel, Belgium

[73] Assignee: Agfa-Gevaert N.V., Mortsel, Belgium

[21] Appl. No.: 08/895,465

[22] Filed: Jul. 16, 1997

[30] Foreign Application Priority Data

Jul. 17, 1996 [EP] European Pat. Off. .............. 96202032

[51] Int. Cl.[6] ...................................................... G06F 19/00

[52] U.S. Cl. ................................ 364/468.05; 364/140.06; 364/471.01; 399/12; 600/300

[58] Field of Search ......................... 364/469.01, 471.01, 364/471.03, 140.02, 140.06, 468.05

[56] References Cited

U.S. PATENT DOCUMENTS 5,491,540 2/1996 Hirst .......................................... 399/12
5,622,429 4/1997 Heinze .................................... 600/300

*Primary Examiner*—William Grant
*Assistant Examiner*—Sheela S. Rao
*Attorney, Agent, or Firm*—Baker & Botts, L.L.P.

[57] ABSTRACT

The apparatus, such as a photographic sheet material processing apparatus, comprises a plurality of operating components selected from output operating components such as a pump (22), a solenoid (30), a heater (25), an electrolysis cell (54), a fan (92), and a drive motor (96), and input operating components, such as a liquid level sensor (24). Operatively linked to these components is a CPU (100), containing information concerning a desired operating sequence for the apparatus, in the form of functional instructions independent of the characteristics of the operating components. Information concerning characteristics of each component is stored in separate memory means (122, 124, . . . etc.). Means (122, 124, . . . etc.) are provided for converting the functional instructions into physical instructions to operate the operating components. The operating components can easily be replaced during servicing without the need for re-programming of the CPU, even if a component is replaced by another having different characteristics.

9 Claims, 2 Drawing Sheets

MULTI-COMPONENT APPARATUS WITH IMPROVED SERVICING CHARACTERISTIC

FIELD OF THE INVENTION

The present invention relates to a multi-component apparatus. In particular the invention concerns such an apparatus which comprises a plurality of operating components operatively linked to a central processing unit.

BACKGROUND OF THE INVENTION

Multi-component apparatuses are common. Examples include electrophotographic printing presses, laser recorders, scanners, copiers, medical diagnostic equipment, coating apparatus, chemical processing apparatus, packaging apparatus, waste disposal apparatus and the like. One example of a multi-component apparatus to which the present invention is particularly relevant is an apparatus for the processing of photographic sheet material, such as X-ray film, pre-sensitised plates, graphic art film and paper, and offset plates. As a rule, a processing apparatus for photographic sheet material comprises several vessels each of which contains a treatment liquid, such as a developer, a fixer and a rinse liquid. The sheet material to be processed is transported through these vessels in turn, by transport means such as one or more pairs of drive rollers, and thereafter optionally to a drying unit. Treatment liquid is pumped into and out of the vessels. The temperature of the treatment liquid in the vessels is usually controlled. One or more vessels may be adapted to expose the sheet material to radiation, in particular to visible light. Visible and/or audible warning signals may be provided to alert the operator to the progress of the processing sequence.

In general terms therefore a typical sheet material processing apparatus, and other multi-component apparatuses, comprises a plurality of operating components and a central processing unit (CPU) operatively linked to these operating components. The CPU contains information concerning at least one desired operating sequence for the apparatus, this information usually being in the form of a programme. The operating components may be "output" operating components such as drive motors and pump motors, or "input" operating components such as temperature sensors and position sensors, but usually the apparatus will include combinations of output and input operating components.

Usually the operating components are connected via an interface board to the host CPU. Several operating components may be connected to the same interface board. If an operating component, such as a pump motor, is connected in this way, the programme running on the host CPU must include information as to the identity of that interface board, and the identity of the connector on that board to which the pump motor is connected, i.e. the "board address" of the pump. If the pump connection is then changed to another connector on the same interface board, or to another interface board, for example because a fault is discovered, the CPU has to be re-programmed with the new board address. Furthermore, the interface board itself has a functionality, new boards requiring new software.

Furthermore, the CPU must be programmed with information concerning the characteristics of the operating component, for example that the pump is of such a nature that the supply of power thereto per unit time will result in a certain volume of liquid being pumped. If the characteristics of the pump are changed, for example because a faulty pump is replaced by one of different characteristics, or it is desired to upgrade the operating components of the apparatus, the CPU has again to be re-programmed with the new pump characteristics in order to ensure predictable operation.

Re-programming of the CPU is disadvantageous, especially since the personnel involved in changing the operating component, i.e. the service engineers, are not necessarily skilled in re-programming and different personnel therefore have to be employed.

U.S. Pat. No. 5491540 (B Mark Hirst/Hewlett-Packard Company) describes a printer or copier apparatus adapted to receive replacement parts that are subject to wear. A control computer is operatively linked to the parts and is pre-loaded with appropriate data that enable identification of a particular replacement part, by reading a serial number stored in a memory chip carried by the replacement part.

OBJECTS OF INVENTION

It is an object of the present invention to provide an apparatus in which operating components can easily be replaced without the need for substantial re-programming of the CPU, even if a component is replaced by another having different characteristics.

SUMMARY OF THE INVENTION

We have discovered that this, and other useful advantages can be achieved when information concerning a desired operating sequence for the apparatus is contained in a central processing unit in the form of functional instructions independent of the characteristics of said operating components, and means are provided for converting said functional instructions into physical instructions to operate the operating components according to the desired operating sequence.

Thus, according to the invention there is provided a multi-component apparatus comprising a plurality of operating components selected from output operating components, input operating components and combinations thereof, and a central processing unit operatively linked to said operating components, said central processing unit containing information concerning at least one desired operating sequence for said apparatus, wherein information concerning characteristics of each said operating component is stored in separate memory means, characterised in that said information concerning at least one desired operating sequence for said apparatus is in the form of functional instructions independent of the characteristics of said operating components, and means are provided for converting said functional instructions into physical instructions to operate said operating components according to said desired operating sequence.

Thus, it will be appreciated that the programme which is typically carried in the CPU, is now seen as comprising two separable elements. Information concerning the desired function of the apparatus, i.e. logical data, such as the speed of sheet material through the apparatus, or the volume of liquid being pumped to vessels of the apparatus per unit time, continues to be stored in the CPU. However, information concerning the characteristics of the operating components and their location, is separately stored for each operating component. In one embodiment of the invention, the separate memory means is removable. In such an embodiment, when the service engineer removes a given operating component, he also removes the store of characteristics information pertaining to that operating component. As he replaces the removed operating component with a new one, he also provides a new information store, containing the characteristics information pertaining to the new operating component. The need for re-programming of the CPU is therefore avoided. The new information store is created off-site, for example as the new operating component is manufactured. In an alternative embodiment, the separate memory means is not removable, but is arranged to be by-passed or even re-programmed by the service engineer. Re-programming of the separate memory means is simpler than re-programming of the CPU.

The advantages of the present invention lie not only in the improved servicing characteristics but also in the quality assurance of replacement components.

The separate memory means, otherwise referred to herein as a "smart node", may be selected from Read Only Memories, Programmable Read Only Memories, Erasable Read Only Memories, Electrical Erasable Read Only Memories, Random Access Memories, and Non-volatile Random Access Memories.

In addition to the information concerning the characteristics of the associated operating component, the smart node may also contain information concerning the logical address of the component. For example, in an apparatus having a number of pumps, each associated with a different treatment vessel, the smart node associated with a given pump may include an identification of the pump, so as to distinguish, for example, the pump associated with vessel #1 from the pump associated with vessel #2. Alternatively, information concerning the logical addresses of the components may be permanently stored in the CPU.

Indeed, the new information store may be part of its associated operating component, i.e. physically coupled thereto. Alternatively, the new information store may be separate from its associated operating component, for example by being in the form of a smart card or interface board.

The output operating components may be selected from drive motors, pump motors, solenoids, brake actuators, light or other radiation emitting devices, sound emitting devices, heaters, coolers and the like.

The input operating components may be selected from temperature sensors, pressure sensors, position sensors, light or other radiation sensitive devices, liquid level sensors and the like.

The apparatus can function in one of two ways. In the first, more preferred, option the CPU sends out logical (i.e. functional) data messages and the smart nodes or the like which are associated with the operating components convert this into physical data message. In the second option the CPU interrogates the separate memories to extract the characteristics information and thereby compiles a configuration file enabling the CPU to send physical data messages to the components.

In the first option, the characteristics of the operating components may remain stored in their associated smart nodes, while in the second option these characteristics may be down-loaded into the CPU when the apparatus starts up. To perform this operation, the CPU may be programmed to interrogate all the smart nodes which at that time are connected to the system.

Thus according to a second aspect of the invention, there is provided a method of operating a multi-component apparatus which comprises a plurality of operating components selected from output operating components, input operating components and combinations thereof, and a central processing unit operatively linked to the components, the central processing unit containing information concerning at least one desired operating sequence for the apparatus, the method being characterised by:

(i) storing the information in the central processing unit in the form of functional instructions independent of the characteristics of the operating components;

(ii) storing information concerning characteristics of each component in separate storage memory means; and (iii) converting the functional instructions into physical instructions to operate the operating components according to the desired operating sequence.

The conversion to physical instructions may take place in the central processing unit following down-loading of the characteristics information from the separate storage means or the conversion to physical instructions may take place at the location of the separate storage means.

An advantage of this construction is that the functional information contained in the CPU can be seen as generic i.e. applicable to a number of different machines designed to perform the same function but using components with different characteristics or to a number of different machines designed to perform different functions using the same components.

The CPU may be in the form of a micro-processor, such as a Philips (Trade Mark) 80592 or an Intel (Trade Mark) 8051 eight bit micro-controller. In a preferred embodiment, the smart nodes are connected to each other by an object oriented communication medium. A controlled area network (CAN) is a suitable medium, optionally as part of a Smart Distribution System (SDS—Trade Mark). Such networks are described by Holger Zeltwanger in the article "An Inside Look at the Fundamentals of CAN", published in Control Engineering, January 1995. CAN constitutes a multi-media bus for data communication. Other communication media can also be used for carrying out the invention, so long as such media allow a data-oriented protocol. In these systems, a number of operating components are connected to the same network line via their associated smart nodes. The CPU sends messages down this line, each message being tagged with a component identifier or logical address of the component for which the message is intended. The smart node recognises the logical address of the component with which it is associated, reads and acts upon the message to which that logical address was tagged part. The smart nodes associated with other operating components do not recognise the logical address tagged to the message and therefore ignore the message. In this manner separate wiring of each and every component to the CPU is avoided.

One and the same operating component may have more than one function. For example a motor may be capable of being driven at different speeds, the different functions being used at different stages of the operation of the apparatus. In this event, the smart node associated with that component may be pre-programmed with more than one logical address.

The present invention is particularly suitable for use in connection with the method described in European patent publication EP 0 736 810-A (Agfa-Gevaert N. V.), inventors J. De Backer and J. Claes, the content of which is incorporated herein by reference. The method described therein is for remotely monitoring and optionally adjusting the operation of a lithographic printing plate processor. A number of processing stations are controlled based on stored operating conditions. Actual operating conditions are detected and displayed, with the stored operating conditions, on a remote computer display.

DETAILED DESCRIPTION OF THE INVENTION

Figure 1:
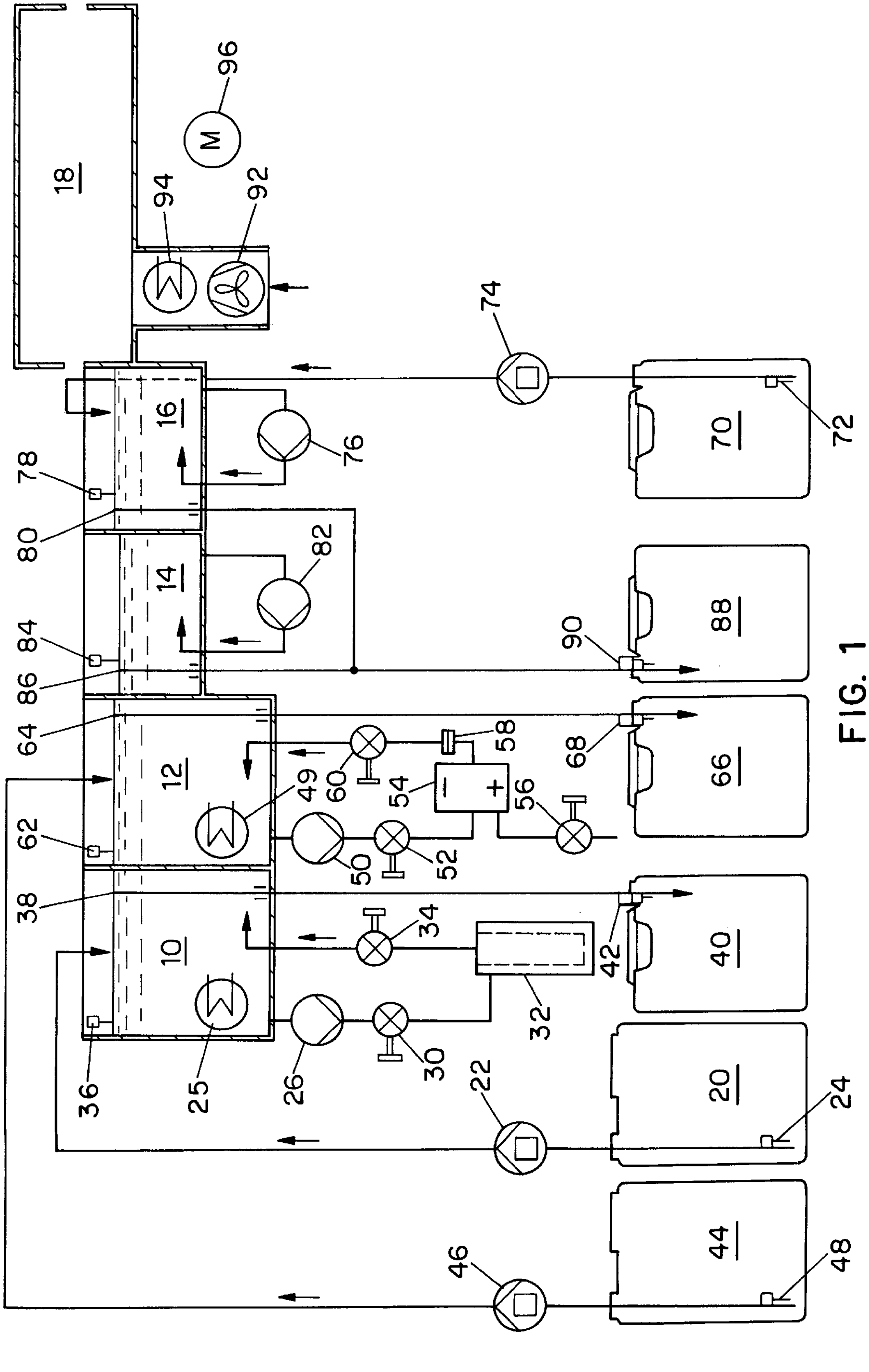
Figure 2:
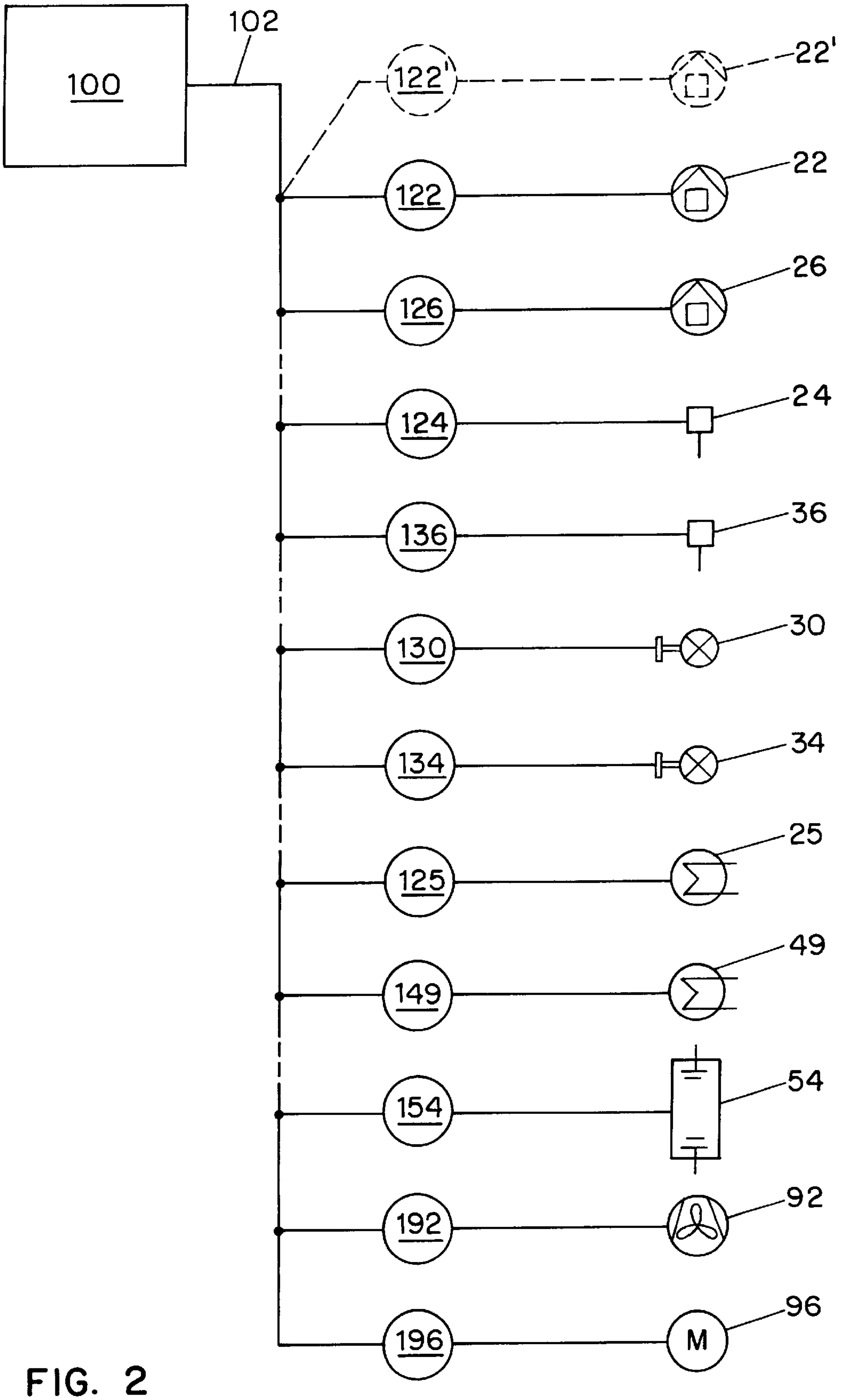

The invention will be described by the following illustrative embodiments with reference to the accompanying drawings without the intention to limit the invention thereto, and in which:

FIG. 1 is a schematic representation of a horizontal photographic sheet material processing apparatus; and FIG. 2 is a schematic representation of the connection of some of the operating components of the apparatus shown in FIG. 1 to a central processing unit.

FIG. 1 shows a photographic sheet material processing apparatus which comprises a number of treatment cells, specifically a developing vessel 10, a fixing vessel 12, a cascade rinsing section comprising a first rinsing vessel 14 and a second rinsing vessel 16, in which rinsing liquid travels in the opposed direction to the sheet material, and a sheet material dryer 18. Sheet material to be processed is fed through the apparatus, namely through cells 10, 12, 14, 16 and 18 in turn by appropriately positioned roller pairs and conveyors (not shown) in a manner well known in the art.

The sheet material first enters the developing vessel 10. Developing liquid is fed from a storage container 20 by way of a supply pump 22 to the developing vessel 10. When the storage container 20 is nearly empty, this is detected by a level sensor 24. The liquid is heated within the developing vessel 10 by means of a heater 25. The liquid is circulated through the developing cell 10 by way of an exterior loop by means of a circulation pump 26. Specifically the pump 26 feeds liquid through a solenoid valve 30 to a filter 32. From the filter 32 the liquid returns to the developing vessel 10 through a solenoid valve 34. The level of liquid in the developing vessel is detected by the level sensor 36. Excess liquid is discharged by way of an overflow 38 to a waste developer storage container 40. When the storage container 40 is nearly full, this is detected by a level sensor 42 positioned therein.

The sheet material then passes to the fixing vessel 12. Fixing liquid is fed from a storage container 44 by way of a supply pump 46 to the fixing vessel 12. When the storage container 44 is nearly empty, this is detected by a level sensor 48. The liquid is heated within the fixing vessel 12 by means of a heater 49. The liquid is circulated through the fixing cell 12 by way of an exterior loop by means of a circulation pump 50. Specifically the pump 50 feeds liquid through a solenoid valve 52 to an electrolysis cell 54, where a proportion of silver is removed. Liquid can be drained from the electrolysis cell 54 by operation of the solenoid valve 56. From the electrolysis cell 54 the liquid returns to the fixing vessel 12 through a fine filter 58 and a solenoid valve 60. The level of liquid in the fixing vessel is detected by the level sensor 62. Excess liquid is discharged by way of an overflow 64 to a waste fixer storage container 66. When the storage container 66 is nearly full, this is detected by a level sensor 68 positioned therein.

The sheet material then passes in turn through the first rinsing vessel 14 and then through the second rinsing vessel 16. Rinsing liquid is fed from a storage container 70 by way of a supply pump 74 to the second rinsing vessel 16. When the storage container 70 is nearly empty, this is detected by a level sensor 72. The liquid is circulated through the second rinsing cell 16 by way of an exterior loop by means of a circulation pump 76. The level of liquid in the rinsing vessel is detected by the level sensor 78. The rinsing liquid cascades from the second rinsing vessel 16 into the first rinsing vessel 14. The rinsing liquid is circulated through the first rinsing cell 14 by way of an exterior loop by means of a circulation pump 82. Excess liquid is discharged from the second rinsing vessel 16 by way of an overflow 80, and from the first rinsing vessel 14 by way of an overflow 86, to a waste rinsing liquid storage container 88. When the storage container 88 is nearly full, this is detected by a level sensor 90 positioned therein.

The sheet material now passes to the dryer cell 18. Drying air is sucked into the dryer by a fan 92 and is heated to an appropriate drying temperature by means of a heater 94. The processed and dried sheet material then leaves the apparatus.

A transport motor 96 provides drive to the roller pairs and conveyors referred to previously, to drive the sheet material through the apparatus at an appropriate speed.

The apparatus described in connection with FIG. 1 is thus a multi-component apparatus. Specifically it contains seven pumps, ten liquid level sensors, five solenoids, three heaters, one electrolysis cell, one fan and one transport motor. Other operating components (not shown) may also be present, such as thermocouples to detect the temperature of the liquid in each vessel, encoders to detect movement of the rollers pairs and conveyors, and photocells to detect the presence of sheet material at various locations within the apparatus.

FIG. 2 shows how some of these components are connected to a central processing unit (CPU) 100. For the sake of clarity, not all the components indicated in FIG. 1 are shown in FIG. 2.

The CPU 100 is programmed with functional information concerning the operating sequence for the apparatus. For example, this programme will include the following functional elements:

(i) the volume of fresh developer added to the developing cell and the frequency of this addition;

(ii) the temperature of the developer in the developing vessel;

(iii) the volume of fresh fixer added to the fixing cell and the frequency of this addition;

(iv) the temperature of the fixer in the fixing vessel;

(v) the flow rate of rinsing liquid through the rinsing vessels 14, 16;

(vi) the frequency and volume of waste rinsing water discharged from the rinsing vessels;

(vii) the drying temperature in the dryer 18.

The CPU 100 has a single output line 102 constituting a controlled area network for the apparatus. Each of the operating components of the apparatus are connected to the line 102 by way of a respective smart node. Thus, pumps 22 and 26 are connected to the line 102 via smart nodes 122 and 126 respectively. Level sensors 24 and 36 are connected to the line 102 via smart nodes 124 and 136 respectively. Solenoids 30 and 34 are connected to the line 102 via smart nodes 130 and 134 respectively. Heaters 25 and 49 are connected to the line 102 via smart nodes 125 and 149 respectively. The electrolysis cell 54 is connected to the line 102 via smart node 154. Fan 92 is connected to the line 102 via smart node 192. Transport motor 96 is connected to the line 102 via smart node 196.

While illustrated in a simplified form in FIG. 2, where the smart nodes are in the form of smart cards, a smart card reader for each component will be included, in a manner well known in the art. Where the smart nodes are carried on an interface board, suitable slots for the accommodation of such boards will be included, in a manner well known in the art.

Each of the smart nodes contains information concerning the characteristics of the component to which it is connected. If one of the components is changed, the associated smart node is also changed.

The signals sent from the CPU 100 down the network line 102 will include logical process data. For example, in respect of the pump 22, the signal may represent the message "pump 50 ml developing liquid". The smart node

122 associated with the pump 22, in this case say a pump capable of pumping 5 ml per second, having recognised and read this message converts it into physical data such as to represent "turn on pump for 10 seconds". The relationship between the logical data and the physical data is of course dependent upon the characteristics of the pump, namely that the component is capable of pumping 5 ml per second, such characteristics being stored in the smart node 122. The smart node 122 having made this conversion then causes the pump 22 to be operated for 10 seconds, with the result that 50 ml of treatment liquid is pumped as desired. If the pump 22 were to be replaced by one with different characteristics, say a pump $\mathbf{22}^1$ capable of pumping 10 ml per second, the smart node 122, or the interface board carrying the smart node 122, would also be replaced. This is shown by broken lines in FIG. 2. The new smart node $\mathbf{122}^1$, carrying the characteristic of the new pump $\mathbf{22}^1$ in its memory, would convert the logical data representing the message "pump 50 ml of treatment liquid" to physical data representing "turn on pump for 5 seconds". The new smart node $\mathbf{122}^1$ having made this conversion then causes the new pump $\mathbf{22}^1$ to be operated for 5 seconds, with the result that 50 ml of development liquid is again pumped. Thus it has been possible to replace the pump 22 with another $\mathbf{22}^1$ having different characteristics while enabling the apparatus to perform the same operation without the need to re-programme the CPU.

In an alternative embodiment, the conversion of logical data to physical data is performed by the CPU, the characteristics of the operating components connected to the network having been automatically down-loaded into the CPU on start up of the apparatus. In this case the replacement of the pump 22 with one of another characteristic will only lead to the same operation being performed once the apparatus has been shut down and started up again, whereupon the characteristics of the new pump $\mathbf{22}^1$ are down-loaded into the CPU 100. However, since it is not common practice to make component replacements while the apparatus is in its operating state, this disadvantage is not seen as being significant.

I claim:

1. An apparatus comprising a plurality of operating components selected from output operating components, input operating components and combinations thereof, and a central processing unit operatively linked to said plurality of operating components, said central processing unit containing information concerning at least one desired operating sequence for said apparatus, wherein information concerning characteristics of each of said plurality of components is stored in separate memory means, said information contained in said central pro concerning at least one desired operating sequence for said apparatus being in the form of functional instructions independent of the characteristics of said operating components, and means for converting said functional instructions into physical instructions to operate said plurality of operating components according to said desired operating sequence.

2. An apparatus according to claim 1, wherein said separate memory means is removable.

3. An apparatus according to claim 2, wherein each said separate removable memory means is carried on a removable device physically separate from the associated component.

4. An apparatus according to claim 2, wherein said removable device is a smart card.

5. An apparatus according to claim 1, wherein said output components are selected from drive motors, pump motors, solenoids, brake actuators, light or other radiation emitting devices, sound emitting devices, heaters, and coolers; and wherein said input operating components are selected from temperature sensors, pressure sensors, position sensors, light or other radiation sensitive devices, and liquid level sensors.

6. An apparatus according to claim 1, which is in the form of a photographic sheet material processing apparatus.

7. A method of operating a multi-component apparatus which comprises a plurality of operating components selected from output operating components, input operating components and combinations thereof, and a central processing unit operatively linked to said components, said central processing unit containing information concerning at least one desired operating sequence for said apparatus, said method being characterised by:

(i) storing said information in said central processing unit in the form of functional instructions independent of the characteristics of said operating components;

(ii) storing information concerning characteristics of each said component in separate storage memory means; and (iii) converting said functional instructions into physical instructions to operate said operating components according to said desired operating sequence.

8. A method according to claim 7, wherein said conversion to physical instructions takes place in the central processing unit following down-loading of the characteristics information from said separate storage means.

9. A method according to claim 7, wherein said conversion to physical instructions takes place at the location of said separate storage means.

* * * * *